US010520052B2

(12) United States Patent
Iwai et al.

(10) Patent No.: US 10,520,052 B2
(45) Date of Patent: Dec. 31, 2019

(54) BICYCLE DISC BRAKE ROTOR

(75) Inventors: Toru Iwai, Osaka (JP); Makoto Souwa, Osaka (JP)

(73) Assignee: Shimano Inc., Osaka (JP)

( * ) Notice: Subject to any disclaimer, the term of this patent is extended or adjusted under 35 U.S.C. 154(b) by 974 days.

(21) Appl. No.: 13/352,868

(22) Filed: Jan. 18, 2012

(65) Prior Publication Data

US 2013/0180807 A1 Jul. 18, 2013

(51) Int. Cl.
*F16D 65/02* (2006.01)
*F16D 65/12* (2006.01)
*B62L 1/00* (2006.01)

(52) U.S. Cl.
CPC .............. *F16D 65/12* (2013.01); *B62L 1/005* (2013.01); *F16D 2065/1316* (2013.01); *F16D 2200/0017* (2013.01); *F16D 2250/0038* (2013.01)

(58) Field of Classification Search
CPC ........ F16D 65/12; F16D 65/127; F16D 69/02; F16D 2065/1316; F16D 2065/132; F16D 2200/0017; F16D 2250/0038; F16D 2250/0046
USPC ........................ 188/24.11, 26, 218 XL, 18 A
See application file for complete search history.

(56) References Cited

U.S. PATENT DOCUMENTS 1,746,494 A * 2/1930 Norton .................. F16D 69/027 188/218 R
6,467,589 B2 * 10/2002 Seymour ................ 188/218 XL
7,416,060 B2 8/2008 Takizawa
7,424,938 B2 9/2008 Takizawa
2003/0010585 A1 1/2003 Okada et al.
2005/0006186 A1 1/2005 Iwai et al.
2005/0056495 A1 * 3/2005 Greppi ............................ 188/26
2006/0272909 A1 * 12/2006 Fuller et al. .............. 188/251 A
2008/0000550 A1 * 1/2008 Holly et al. .................. 148/217
2008/0060891 A1 3/2008 Chen et al.
2011/0240420 A1 10/2011 Souwa et al.
2012/0000736 A1 1/2012 Koshiyama

FOREIGN PATENT DOCUMENTS

CN 102021511 A 4/2011
CN 101096986 B 8/2011
CN 102308112 A 1/2012
TW 200904700 A 2/2009

OTHER PUBLICATIONS

Ding Qingru; Mechanisms of Alumetizing of Steel; Corrosion & Protection, vol. 20, No. 11; Nov. 1999.

* cited by examiner

*Primary Examiner* — Thomas W Irvin

(74) *Attorney, Agent, or Firm* — Global IP Counselors, LLP

(57) ABSTRACT

A bicycle disc brake rotor is provided with a base rotor plate and a surface region. The base rotor plate includes an outer portion that is formed of iron. The outer portion has first and second base surfaces facing in opposite axial directions. The surface region is formed by a diffusion process on the base rotor plate. The surface region has a corrosion resistant characteristic which is superior to the base rotor plate.

9 Claims, 5 Drawing Sheets

BICYCLE DISC BRAKE ROTOR

BACKGROUND

Field of the Invention

This invention generally relates to a bicycle disc brake rotor. More specifically, the present invention relates to a bicycle disc brake rotor with a configuration that promotes cooling of the braking surfaces.

Background Information

In recent years, some bicycles have been provided with disc brakes. Disc brake systems provide a substantial braking power in relationship to the amount of braking force applied to the brake lever. Also, disc brake systems typically provide a high level of consistency in all types of weather and riding conditions. Disc brake systems typically include a caliper housing, a first movable brake pad and a second fixed or movable brake pad. Disc brakes can be hydraulically actuated or mechanically actuated for moving the movable brake pad(s). The brake pads are positioned on either side of a rotor, which is attached to the front or back wheel of a bicycle. The brake pads are pressed against a brake disc or rotor that is fixed to the wheel to slow down or stop the rotation of the disc, and thus, slow down or stop the rotation of the wheel.

SUMMARY

While disc brake systems provide excellent performance, the braking action tends to generate a substantial amount of heat in the disc brake rotor. Thus, one aspect of this disclosure is to provide a disc brake rotor with a configuration that more efficiently radiates heat from the outer portion of the disc brake rotor.

In general, an iron is never used as a matrix or base material of bicycle brake disc rotor. In particular, over time, iron will usually corrode and rust due to exposure to the environment. Furthermore, iron by itself does not have sufficient strength for being used as a bicycle disc brake rotor.

Basically, in view of the state of the known technology, a bicycle disc brake rotor is basically provided that comprises a base rotor plate and a surface region. The base rotor plate includes an outer portion that is formed of iron. The outer portion has first and second base surfaces facing in opposite axial directions. The surface region is formed by a diffusion process on the base rotor plate. The surface region has a corrosion resistant characteristic which is superior to the base rotor plate.

These and other objects, features, aspects and advantages of the disclosed bicycle disc brake rotor will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
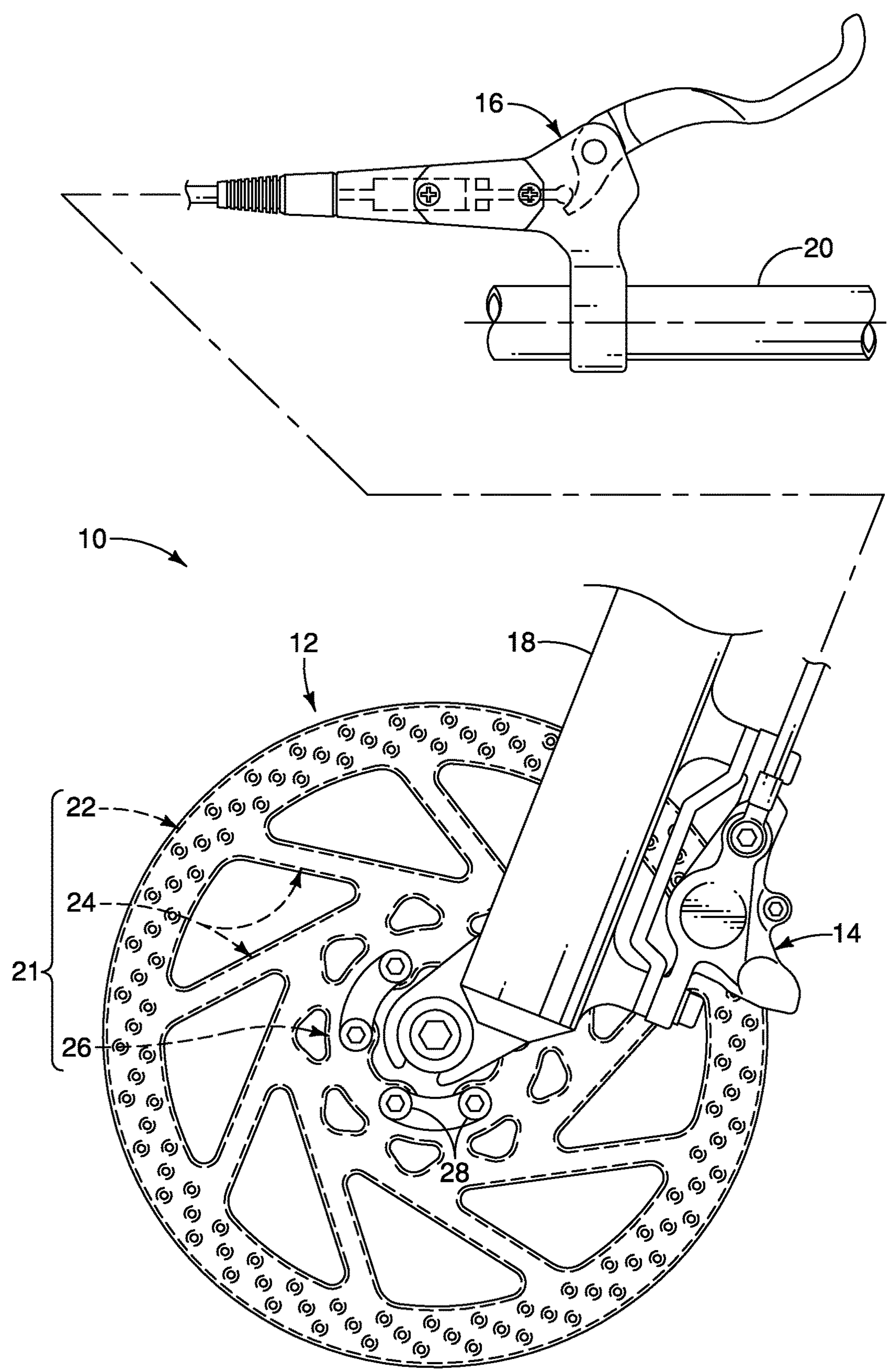
FIG. 1 is a partial side elevational view of a front disc brake system including a bicycle disc brake rotor in accordance with a first embodiment.

Referring initially to FIG. 1, a front disc brake system 10 is illustrated that includes a bicycle disc brake rotor 12 in accordance with a first embodiment. As explained below, the bicycle disc brake rotor 12 has a configuration that promotes cooling of the bicycle disc brake rotor 12. The front disc brake system 10 further includes a bicycle disc brake caliper 14 and a brake operating (actuating) mechanism 16. Basically, the bicycle disc brake rotor 12 is fixedly attached to a bicycle hub of a bicycle wheel (not shown). The bicycle disc brake caliper 14 is mounted to a bicycle fork 18, while brake operating mechanism 16 is attached to a bicycle handlebar 20. Since the operation and construction of the front disc brake system 10 is conventional, except for the construction of the bicycle disc brake rotor 12, the front disc brake system 10 will not be discussed or shown in further detail herein. Moreover, while the front disc brake system 10 is illustrated as a hydraulic braking system, the bicycle disc brake rotor 12 can be used with other types of braking systems as needed and/or desired.

The disc brake caliper 14 is constructed for selectively gripping (stopping rotation) of the bicycle disc brake rotor 12 to stop or slow the rotation of a bicycle wheel (not shown). During this braking operation, heat is generated that is transferred to the bicycle disc brake rotor 12 and the bicycle disc brake caliper 14. As explained below, the bicycle disc brake rotor 12 is designed to dissipate the heat generated during braking.

Figure 2:
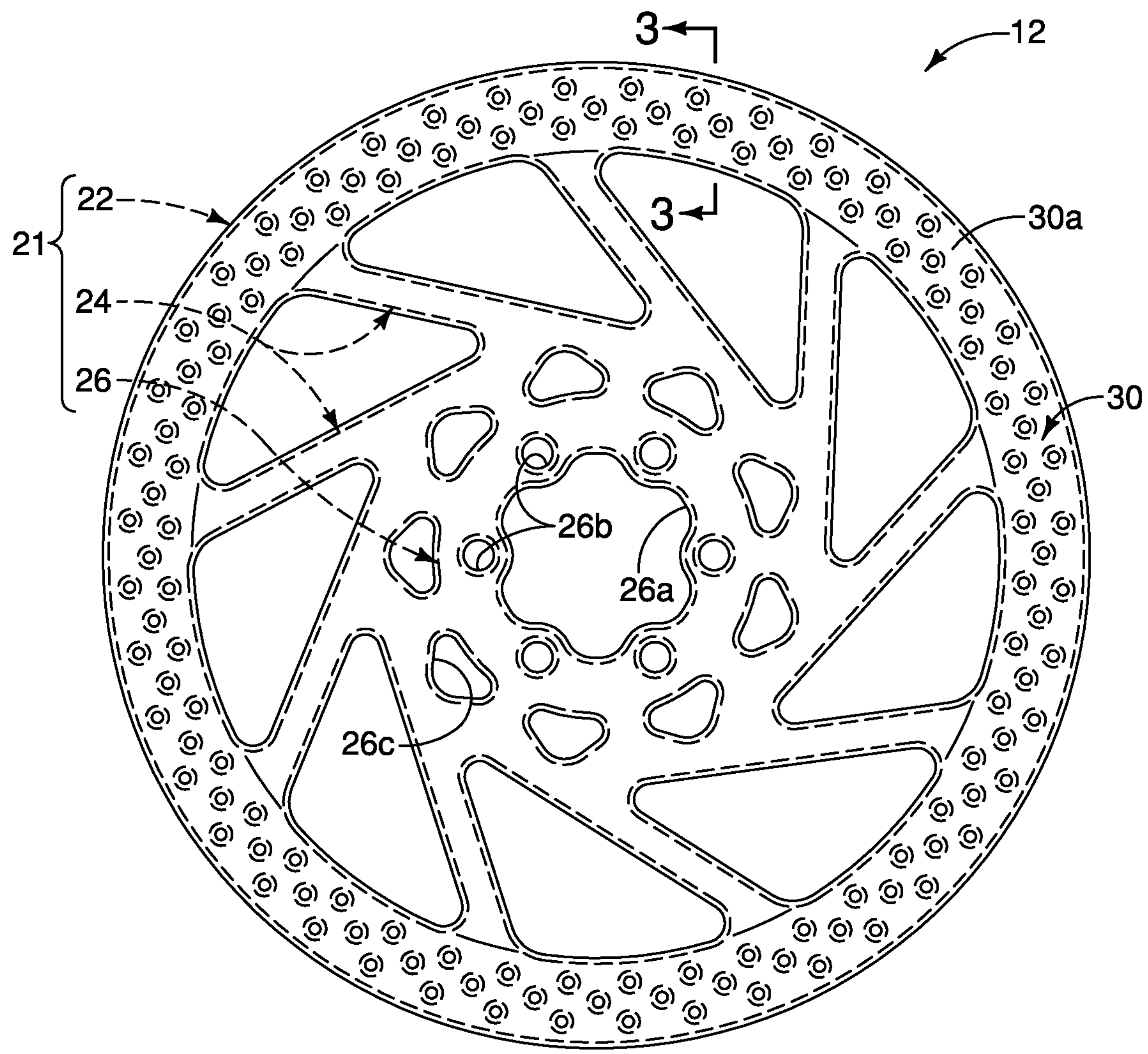
FIG. 2 is a side elevational view of the disc brake rotor illustrated in FIG. 1.

As seen in FIG. 2, the bicycle disc brake rotor 12 has a base rotor plate 21 that basically includes an outer portion 22, a plurality of connecting arms 24 extending radially inward from the outer portion 22, and a hub mounting portion 26 coupled to inner ends of the connecting arms 24. Here in the first illustrated embodiment, the outer portion 22, the connecting arms 24 and the hub mounting portion 26 are integrally formed as a one-piece member of iron. For example, the base rotor plate 21 can be formed by stamping a cold rolled carbon steel sheet (e.g., JIS G 3141 SPCC) to the desired shape. Although iron does not by itself does not have sufficient strength for being used as a bicycle disc brake rotor, iron has a very good heat transfer efficiency (i.e., 80 W/mK), which is about three or four times greater than stainless steel (i.e., 20 W/mK).

The outer portion 22 of the base rotor plate 21 has an outer peripheral edge 22*a* and an inner peripheral edge 22*b*. The connecting arms 24 extend radially inward from the inner peripheral edge 22*b* of the outer portion 22. The hub mounting portion 26 is coupled to the inner ends of the connecting arms 24. The hub mounting portion 26 is coupled by fasteners 28 (e.g., bolts) to the bicycle hub. While the base rotor plate 21 is illustrated as a one-piece member, the base rotor plate 21 can be made of more a one piece if needed and/or desired. In the case of the first illustrated embodiment, the base rotor plate 21 has first and second base surfaces 21*a* and 21*b* that face in opposite axial directions of the bicycle disc brake rotor 12. The first and second base surfaces 21*a* and 21*b* are flat surfaces that extend over the outer portion 22, the connecting arms 24 and the hub mounting portion 26. However, the first and second base surfaces 21*a* and 21*b* do not need to be entirely flat. For example, the first and second base surfaces 21*a* and 21*b* can be contoured in the areas of the connecting arms 24 and the hub mounting portion 26. Moreover, the outer portion 22 can have recesses instead of through holes as shown. In any case, the outer portion 22 of the base rotor plate 21 includes at least a portion of the first and second base surfaces 21*a* and 21*b* that face in opposite axial directions of the bicycle disc brake rotor 12.

Figure 3:
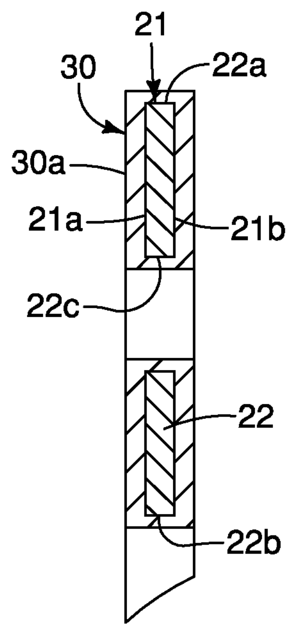
FIG. 3 is a partial cross sectional view of the bicycle disc brake rotor illustrated in FIGS. 1 to 4 as seen along section line 3-3 of FIG. 2.
Figure 4:
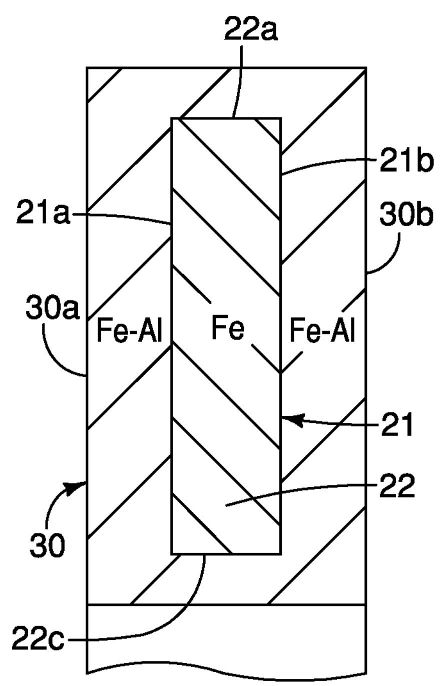
FIG. 4 is an enlarged, partial cross sectional view of a portion of the bicycle disc brake rotor illustrated in FIG. 3.

Referring to FIGS. 3 and 4, the bicycle disc brake rotor 12 is chemically treated to further include a surface region 30 that forms a protective region in the base rotor plate 21 by a diffusion process such as a calorizing process in this first embodiment. Preferably, the surface region 30 is basically an alloy zone or layer that is chemically formed in all exposed surfaces of the base rotor plate 21. For the sake of illustration, the thickness of the surface region 30 has been exaggerated. Typically, the thickness of the surface region 30 is in the range of about 0.02 millimeter to 0.1 millimeter. In any case, for example, the thickness of the surface region 30 varies depending on the length of time in which the bicycle disc brake rotor 12 is subjected to the diffusion process (e.g., the calorizing process). Using a calorizing process, the surface region 30 includes a calorized zone having a compounded material that is infiltrated into at least the first and second base surfaces 21*a* and 21*b*. Also using a calorizing process, at least one or both of the peripheral edges 22*a* and 22*b* of the outer portion 22 can also have a calorized zone. The calorized zone of the surface region 30 includes an aluminum and iron compound (alloy) in the illustrated embodiment. In particular, using the calorizing process aluminum diffuses into the iron of the first and second base surfaces 21*a* and 21*b* to form an alloy with excellent heat and corrosion-resistance properties; yet the iron substrate or base material retains its inherent properties. Thus, the calorizing process does not change the mechanical properties of the iron substrate or base material of the outer portion 22. Also the calorizing process does not produce an aluminum coating on the iron substrate or base of the outer portion 22. Instead, the process forms a true alloy with the iron substrate or base material. The protective diffusion or calorized zone therefore cannot be removed except by a machining operation.

Using calorized zone of the surface region 30 to cover the first and second base surfaces 21*a* and 21*b* will protect and strengthen the iron of the base rotor plate 21. In this way, iron can be used as the matrix or base material that forms the base rotor plate 21 of the bicycle disc brake rotor 12. The calorized zone of the surface region 30 chemically infiltrates into the first and second base surfaces 21*a* and 21*b*. In the illustrated embodiment, the calorized zone of the surface region 30 is also disposed along the connecting arms 24 and the hub mounting portion 26. Since the calorized zone of the surface region 30 is completely formed over the base rotor plate 21, peripheral edges 22*c* that define holes in the outer portion 22 and the peripheral edges 26*a* and 26*b* that define a center opening and holes in the hub mounting portion 26 are also provided with the calorized zone of the surface region 30.

In any case, the calorized zone of the surface region 30 at least overlies the first and second base surfaces 21*a* and 21*b* along the outer portion 22 of the base rotor plate 21 to form first and second outer surfaces. Thus, the sections of the calorized zone of the surface region 30 that overlie the outer portion 22 constitute first and second braking surfaces of the bicycle disc brake rotor 12. Thus, the sections of the first and second outer surfaces 30*a* and 30*b* that overlie the outer portion 22 are directly contacted by the brake pads of the bicycle disc brake caliper 14. As a result, in the first embodiment, the calorized zone of the surface region 30 overlies an iron core of the base rotor plate 21 to provide both the durability and powerful braking properties of the calorized zone of the surface region 30 and the heat dissipation of iron.

In the illustrated embodiment, the calorized zone of the surface region 30 is disposed along all exposed peripheral edges of the base rotor plate 21. In other words, the edges of the outer portion 22, the connecting arms 24 and the hub mounting portion 26 are covered by the calorized zone of the surface region 30. In this way, the calorized zone of the surface region 30 prevents corroding and rusting of the edges of the base rotor plate 21.

Figure 5:
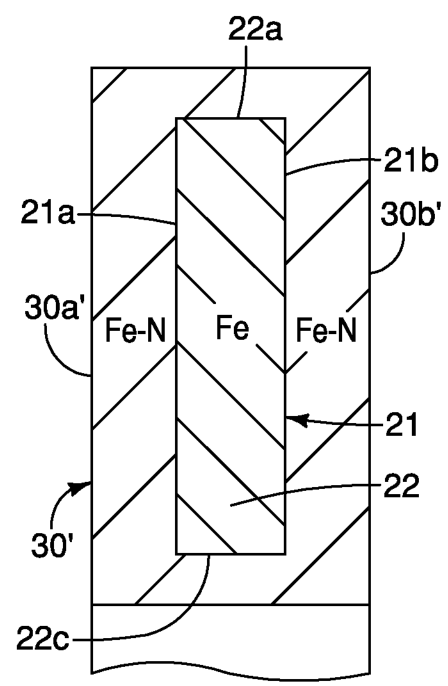
FIG. 5 is an enlarged, partial cross sectional view of a portion of the bicycle disc brake rotor illustrated in FIG. 3, but with a different diffused zone formed in the base rotor plate.

As seen in FIG. 5, alternatively, the base rotor plate 21 is chemically treated to further include a surface region 30' using nitrogen treating process (e.g., a nitriding and/or nitrogen fixation). Nitriding is a diffusion process that can be carried out using solid, liquid or gaseous media. For the sake of illustration, the thickness of the surface region 30' has been exaggerated. Typically, the thickness of the surface region 30' is in the range of about 0.02 millimeter to 0.13 millimeter. In any case, for example, the thickness of the surface region 30' varies depending on the type of nitriding process and the control parameters being used in treating the bicycle disc brake rotor 12. Preferably, the surface region 30' involves diffusion of nitrogen into at least the first and second base surfaces 21*a* and 21*b* of the base rotor plate 21 at an elevated temperature. In other words, nitriding is a heat treating process that diffuses nitrogen into the first and second base surfaces 21*a* and 21*b* of the base rotor plate 21 to create the surface region 30' (case hardened surfaces). Thus, the formation of nitrides in the nitrided zone provides increased hardness to the first and second base surfaces 21*a* and 21*b* of the base rotor plate 21. The thickness and phase constitution of the resulting nitrided zone (i.e., nitriding layers) can be selected and the process optimized for the particular properties required. The nitriding is typically carried out in a suitable temperature range such that the surface region 30' includes a nitrided zone having a nitrogen martensitic region. Thus, the surface region 30' includes a diffused zone (i.e., nitrided zone when nitriding is used) that increases the hardness of the first and second base surfaces 21*a* and 21*b* of the base rotor plate 21. The nitriding of the first and second base surfaces 21*a* and 21*b* of the base rotor plate 21 does not change the mechanical properties of the iron substrate or base material of the base rotor plate 21. Also the nitriding does not produce a coating on the iron substrate or base. Instead, the nitriding forms a true alloy with the iron substrate or base material of the base rotor plate 21 that can exfoliate. The protective diffused or nitrided zone therefore cannot be removed from the base rotor plate 21 except by a machining operation. In addition to the first and second base surfaces 21*a* and 21*b* having a nitrided zone, at least one or both of the peripheral edges 22*a* and 22*b* of the outer portion 22 can also have a nitrided zone. Preferably, as illustrated in the first embodiment, the surface region 30' is basically an alloy zone or layer that is chemically formed in all exposed surfaces of the base rotor plate 21.

Figure 6:
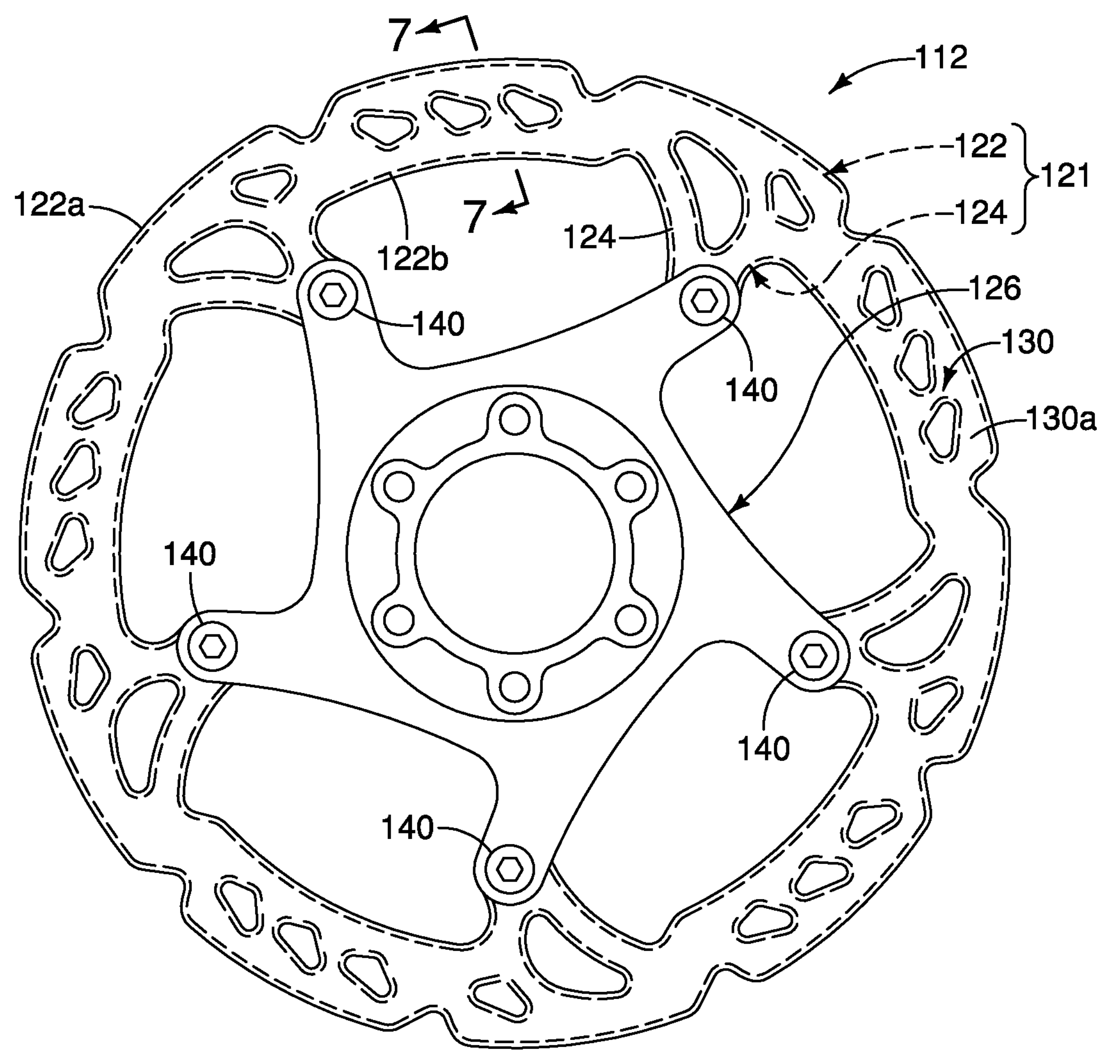
FIG. 6 is a side elevational view of a bicycle disc brake rotor in accordance with a second embodiment.
Figure 7:
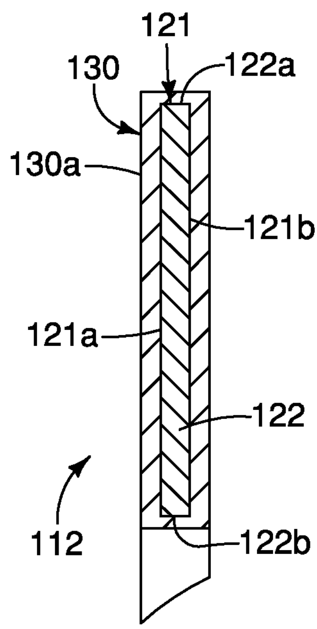
FIG. 7 is a partial cross sectional view of the bicycle disc brake rotor illustrated in FIG. 6 as seen along section line 7-7 of FIG. 6.
Figure 8:
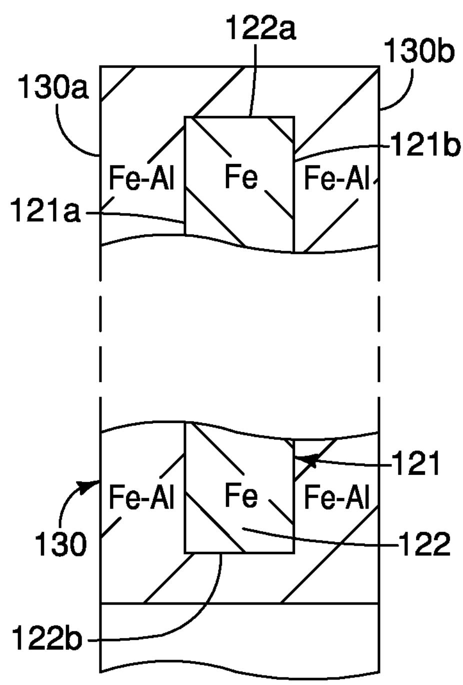
FIG. 8 is an enlarged, partial cross sectional view of a portion of the bicycle disc brake rotor illustrated in FIG. 7.
Figure 9:
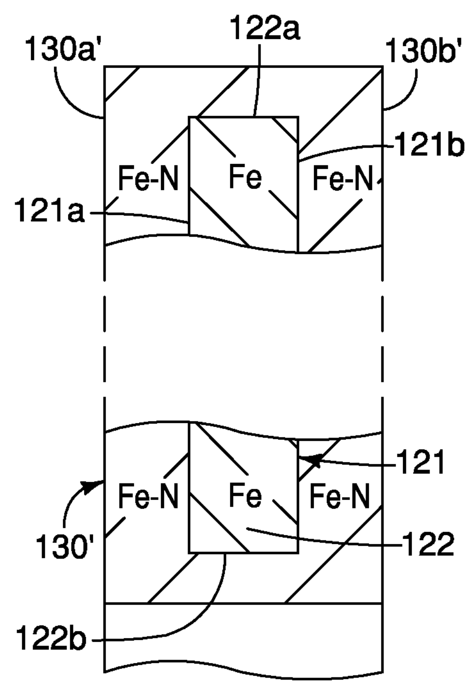
FIG. 9 is an enlarged, partial cross sectional view of a portion of the bicycle disc brake rotor illustrated in FIG. 7 but with a different diffused zone formed in the base rotor plate.

As seen in FIGS. 6 to 8, a bicycle disc brake rotor 112 is illustrated in a accordance with a second embodiment. Here, the bicycle disc brake rotor 112 includes a base rotor plate 121 made of iron. The base rotor plate 121 includes an outer portion 122 and a plurality of connecting arms 124. The connecting arms 124 extend radially inward from the outer portion 122 to free ends that have a fastener receiving hole. A hub mounting portion 126 is coupled to inner ends of the connecting arms 124 by a plurality of fasteners 140. Thus, the hub mounting portion 126 is a separate piece from the outer portion 122 and the connecting arms 124 in the second embodiment. The outer portion 122 and the connecting arms 124 are constructed in an identical manner as the first embodiment. In other words, the bicycle disc brake rotor 112 further includes a surface region 130, as seen in FIG. 8, or a surface region 130', as seen in FIG. 9. In the case of the surface region 130, as seen in FIG. 8, the surface region 130 preferably includes a calorized zone having a compounded material that is infiltrated into first and second base surfaces 121*a* and 121*b* and outer and inner peripheral edges 122*a* and 122*b* of the outer portion 122. The calorized zone of the surface region 130 is an aluminum and iron compound similar to the first embodiment.

In the case of the surface region 130', as seen in FIG. 9, the surface 130' preferably includes a nitrided zone resulting from the diffusion of nitrogen into the first and second base surfaces 121*a* and 121*b* of the base rotor plate 121. The nitriding is typically carried out in a suitable temperature range such that the surface region 130' includes a nitrogen martensitic region similar to the first embodiment.

The hub mounting portion 126 can be constructed as a one piece, unitary member using conventional manufacturing methods or can be made of several pieces as needed and/or desired. In view of the similarities between the bicycle disc brake rotors 12 and 112, the bicycle disc brake rotor 112 will not be discussed in further detail.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle disc brake rotor comprising:

a base rotor plate including an outer portion formed of iron, the outer portion having first and second base surfaces facing in opposite axial directions; and a surface region formed by a diffusion process on the base rotor plate, the diffusion process being a calorizing process, and the surface region having a corrosion resistant characteristic which, is superior to the base rotor plate, and including a calorized zone comprising an alloy consisting of aluminum and iron, and the calorized zone being chemically infiltrated into the first and second base surfaces and at least one peripheral edge of the outer portion;

wherein the base plate comprises an inner portion comprising steel, the outer portion surrounding an entirety of the inner portion.

2. The bicycle disc brake rotor according to claim 1, wherein the base rotor plate further includes a plurality of connecting arms extending radially inward from the outer portion.

3. The bicycle disc brake rotor according to claim 2, wherein the surface region is formed along opposite sides of the connecting arms.

4. The bicycle disc brake rotor according to claim 2, wherein the connecting arms have outer ends integrally formed as a one-piece member with the outer portion.

5. The bicycle disc brake rotor according to claim 2, further comprising a hub mounting portion that is coupled to inner ends of the connecting arms.

6. The bicycle disc brake rotor according to claim 5, wherein the surface region is formed on all exposed surfaces of the outer portion, the connecting arms and the hub mounting portion.

7. The bicycle disc brake rotor according to claim 5, wherein the hub mounting portion is integrally formed as a one-piece member with the connecting arms.

8. The bicycle disc brake rotor according to claim 5, wherein the hub mounting portion is a separate piece that is fixed to the connecting arms.

9. The bicycle disc brake rotor according to claim 5, wherein the at least one peripheral edge of the outer portion is a radially facing edge.

* * * * *